(12) United States Patent
Lausch

(10) Patent No.: US 6,967,674 B1
(45) Date of Patent: Nov. 22, 2005

(54) METHOD AND DEVICE FOR DETECTING AND ANALYZING THE RECEPTION BEHAVIOR OF PEOPLE

(75) Inventor: Holger Lausch, Jena (DE)

(73) Assignee: Displaycom GmbH, Jena (DE)

( * ) Notice: Subject to any disclaimer, the term of this patent is extended or adjusted under 35 U.S.C. 154(b) by 569 days.

(21) Appl. No.: 10/069,907

(22) PCT Filed: Sep. 6, 2000

(86) PCT No.: PCT/EP00/08698

§ 371 (c)(1),
(2), (4) Date: Feb. 21, 2002

(87) PCT Pub. No.: WO01/18697

PCT Pub. Date: Mar. 15, 2001

(30) Foreign Application Priority Data

Sep. 6, 1999 (DE) ................................ 199 43 703

(51) Int. Cl.[7] .............................................. H04N 7/18
(52) U.S. Cl. ....................................... 348/143; 348/169
(58) Field of Search ........................ 348/143, 149–150, 348/162–164, 169, 153, 159; 382/103–104; 340/539.25, 541, 545.3, 565; 250/336.1, 250/339.02

(56) References Cited

U.S. PATENT DOCUMENTS

| | | | | |
|---|---|---|---|---|
| 4,839,631 A | * | 6/1989 | Tsuji .......................... 340/541 |
| 4,858,000 A | * | 8/1989 | Lu .............................. 725/12 |
| 5,063,603 A | * | 11/1991 | Burt ........................... 382/115 |
| 5,097,328 A | * | 3/1992 | Boyette ....................... 348/150 |
| 5,121,201 A | | 6/1992 | Seki ........................... 348/143 |
| 5,305,390 A | * | 4/1994 | Frey et al. ................... 382/115 |
| 5,712,830 A | * | 1/1998 | Ross et al. ..................... 367/93 |
| 5,764,283 A | | 6/1998 | Pingali et al. ............... 348/169 |
| 5,771,307 A | * | 6/1998 | Lu et al. ...................... 382/116 |
| 5,923,252 A | | 7/1999 | Sizer et al. ............... 340/573.1 |
| 5,995,206 A | * | 11/1999 | Morinaka et al. ........... 356/4.01 |

FOREIGN PATENT DOCUMENTS

| | | | |
|---|---|---|---|
| DE | 689 27 215 | 1/1997 | |
| DE | 196 41 000 | 4/1998 | |
| EP | 0823821 | 2/1998 | ............ H04N 7/18 |
| WO | 9427408 | 11/1994 | ............ H04N 7/18 |
| WO | 9808208 | 2/1998 | ............ G08G 1/04 |
| WO | 9822901 | 5/1998 | ........... G06F 27/00 |

OTHER PUBLICATIONS

"Extraction of persons and video images" K. Huggle et al., 17th DAGM symposium, Bielefeld, Sep. 13-15, 1995, Springer-Verlag, pp. 134-144.

* cited by examiner

*Primary Examiner*—Vu Le
(74) *Attorney, Agent, or Firm*—Jordan and Hamburg LLP

(57) ABSTRACT

The invention relates to a method and device for detecting and analyzing the reception behavior of people in at last one reception room according to visual, audiovisual and/or auditory messages, actions and/or to the guiding of flows of customers. The method should be able to be realized with a lower degree of complexity than that of prior art methods. The invention is characterized in that, from the moment each person enters the reception room until their departure, their location coordinates, body coordinates, turning movements and rotating movements of their body and/or of parts of their body, as well as the posture of their body and/or the position of their extremities are detected with a frequency that is greater than one.

14 Claims, 3 Drawing Sheets

METHOD AND DEVICE FOR DETECTING AND ANALYZING THE RECEPTION BEHAVIOR OF PEOPLE

BACKGROUND OF THE INVENTION

Figure 1:
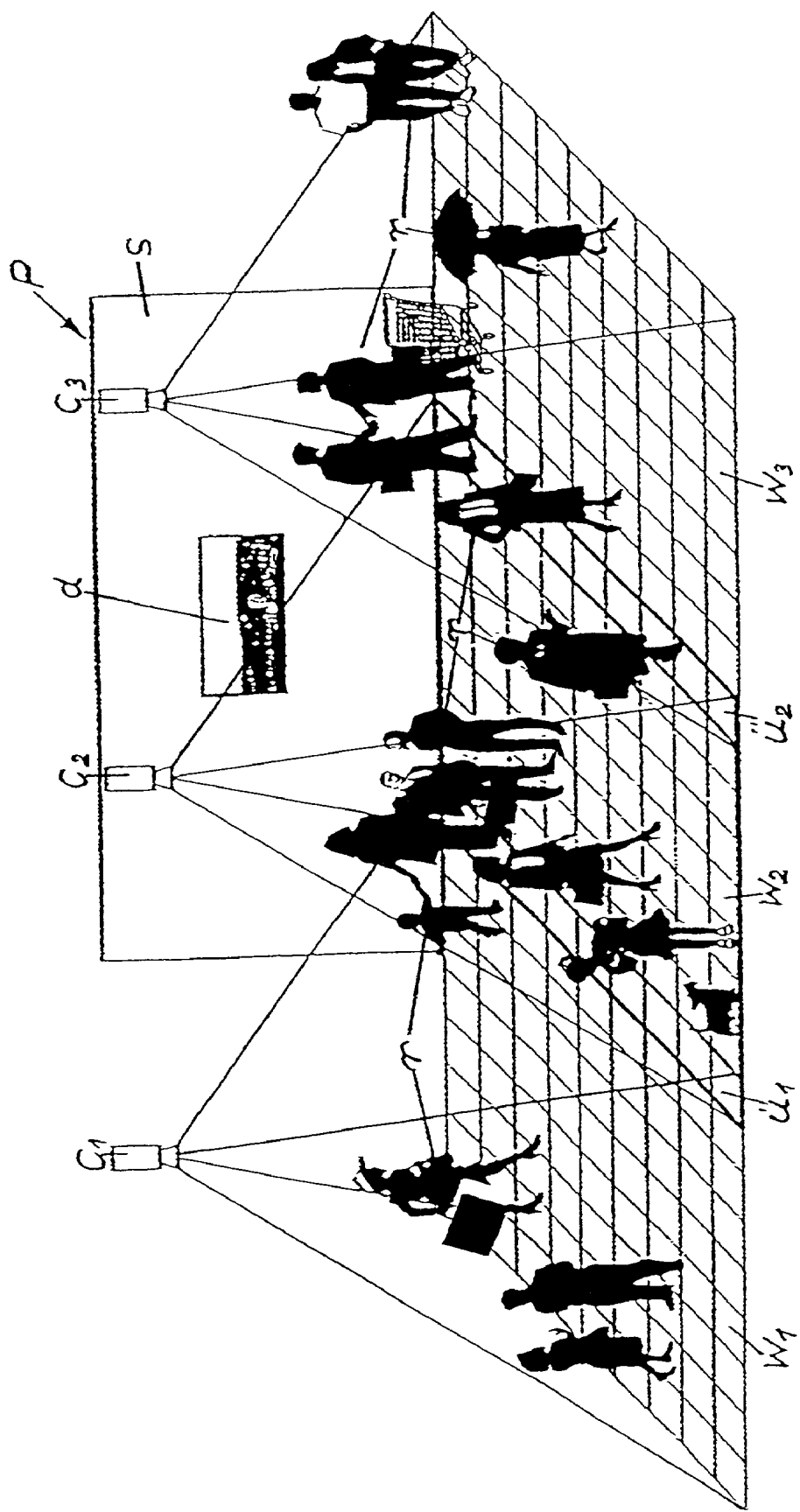

The invention relates to a method and arrangement for detecting and analyzing the reception behavior of people in at least one reception room in dependence on messages transmitted visually, audiovisually and/or auditorily, according to the type of claims. In particular, the invention relates to the automatically and objectively verifiable detection of the advertising effectiveness of messages, activities and facilities for guiding flows of customers, as well as for detecting the intentional customer behavior in shops, shopping streets, shopping arcades, terminals, railway stations, petrol stations etc.

For detecting the effectiveness of advertising measures for products and services, sensors such as infrared sensors, CCDs and the like are used in a suitable arrangement in order to count persons on entering an advertised range and on departing from the same, as well as to detect more or less statistically how long they stay in the advertised range. If necessary, also the buying behavior of the persons in dependence on an advertising campaign, which is on or not, can be indirectly detected by detecting the actually bought goods via a registration by the electronic cash at the exit of an advertising range and a purchasing area, respectively. The results obtained can be evaluated in a computer in order to draw certain conclusions from the buying behavior of the recipients in dependence on advertising. This method, however, is not very precise in its presently practiced form since, for example, the mere presence in an advertised range does not tell anything on the attention paid to the advertising.

A precise method for detecting the perception of the visual or audiovisual messages is the so-called "eye-tracking", which detects and registers the eye movements of one or a few person/s by means of suitable sensors provided at suitable locations. The position of the eye and of the pupil signalizes the perception of and the attention to the advertising instruments by the respective recipient. The relation between the perception of and the attention to, respectively, the advertising and the buying behavior of the recipient can be found out by a long analyzing chain in combination with interviews. This method is technologically very expensive when one considers that, inter alia, a plurality of recipients is staying in an advertising and shopping range, whereby the movements of the eyes of each recipient have to be tracked.

Furthermore, there are various methods known for selecting persons in and from video images, as well as for detecting head and shoulder formations and for detecting and storing faces. They are used for counting and identifying as well as for verifying the presence of persons. Thereby head or shoulders, among others, are generally identified and body models are associated thereto. These modeled bodies and the body coordinates resulting therefrom are, to the largest extent, virtual ones and they are not suitable for a real attention analysis and communication analysis.

SUMMARY OF THE INVENTION

It is an object of the present invention to provide a precise method, which is of low expenditures, for detecting, analyzing, and evaluating the movements of persons to find out the advertising efficiency of messages, actions and customer flow guiding, and an arrangement for carrying out the same.

According to the invention, the object is realized by the features of the first and the fourth generic claim which are advantageously embodied by the features of the dependent claims.

The invention is characterized in that a definite room is repeatedly detected in its entirety and its details by aid of at least one passive or active sensor at a comparatively high frequency. The detection can be combined with a counting of the persons and/or with an identification of the same. The detection frequency shall be greater unity, it will advantageously be 7 through 30 Hz. The sensor/s can be a CCD-camera (passive) or a laser or other sensors emitting and detecting, respectively, electromagnetic or acoustic waves and thermal radiation, respectively, (active and passive). It/they can be located at the ceiling or at the sidewalls in the upper range of the defined room. When an electromagnetic or acoustic or thermal transmitter is used, then the contents of the room is scanned in a rapid sequence and in this way the profile across the ground plan of the room is actively generated including the objects and subjects, respectively, which are present in the room whereas, when using a CCD-camera the contents of the room is imaged on a CCD-matrix which itself is passive as concerns the imaging process. Anyhow, not only all changes in the room can be registered and the tracks of the persons and the objects moving in the room from their entry into the room up to their exit therefrom, but also the turns of the body and of the head of a respective person and the intentional turns, the changes in their posture and the posture of their extremities, respectively, can be time dependently detected, so can the speed and the staying times of the individual objects and subjects. Non-moving objects will also be registered, but they will be eliminated from the further data processing or rather will not be considered thereby. The contents of the room can be detected by a single-image method or by a two-image method (stereoscopically). Furthermore, it will be possible to evaluate not only black-and-white images but also colored images. Furthermore it is possible to, for example, spectroscopically evaluate not only optically produced images and mirrored images, respectively, but also such having been generated by radio or thermal radiation. In this way it is also possible to detect objects and subjects by their size, gender and age provided that they are in the defined room.

According to the invention preferably means and methods (algorithm) of the image processing are used for detecting and identifying objects and subjects being present, respectively, moving in the defined room. Concentration points are deducted from gray values and chromatical values, respectively, or from characterizing, preferably circumscribing, polygons, including triangles. The moving behavior of persons and objects will be deducted from the time-dependent position variations of said concentration points. Also differential concentration points can be formed for detecting the number, position, direction of movement, patterns of movement, speeds, staying times, body postures and body turns of the persons, as well as their lines of sight. Such differential concentration points can be captured in a Cartesian spatial coordinate system or by vectors and will be processed under inclusion of prominent points or lines of the body, of the extremities of the same, of shoulders and/or the head of persons.

In contrast to the known methods, the inventional method permits a higher counting precision since the counting is carried out in the room and not along a barrier (line, plane). A further differentiation of the persons captured will be possible by the spectroscopic and/or thermal analysis of the radiation and waves, respectively, reflected at said persons.

An arrangement for detecting number and movements, features and coordinates of objects and subjects in dependence on the offered messages comprises in principle one or a plurality of sensor/s (sensor modules) or camera/s (camera modules) that is/are arranged at the ceiling and/or at the sidewalls, in particular in the upper range of a defined room near the ceiling. It further comprises image processing units downstream of said sensors/cameras, whereby said image processing units comprise frame grabbers, socket interfaces, Ethernet interfaces and other remote data transmission interfaces, respectively, and a database module (with socket interface and Ethernet interface, respectively). The individual database modules can be connected to a central evaluation and/or instruction module via remote data transmission, whereby said central evaluation and/or instruction module forms the results from the signals provided by the sensors and is capable of influencing and controlling the messages, actions, and customer guiding systems offered in the defined rooms. Each sensor module and camera module, respectively, is followed by a sensor signal module and an image processing module, respectively, which captures each object or subject entering the defined room and identifies the same as a such one and differentiates the same, where appropriate. Due to the repeated detection or exposure of the room and its contents, they detect in the manner as described hereinbefore the track of the object/subject, its movements in and through the room up to exiting the room, as well as its specific features obtained in this way, and they feed the results achieved in this way to the evaluating database module. Thereby one database module can belong to a plurality of sensor modules and image processing modules.

In interaction between the sensor information processing and the image processing, respectively, and the statistically evaluating database, the sensor module and the image processing module, respectively, is capable of constantly generating a plurality of data. The analysis of said data in the database module delivers, optionally and simultaneously, respectively, information on the customer flow and the recipient behavior up to the individual customer, whereby these data can be quantified and qualified. If appropriate and on request of the image projection for the advertising display, the sensor module and the image processing module, respectively, can be re-started, interrogated and/or the information of the same detected with each new advertising spot. In the first and the second case described hereinbefore, the time-related and spot-related respectively contents-related analysis of the recipient behavior is possible. In the second case mentioned hereinbefore, only a spot-related analysis of the recipient behavior can be carried out as a whole. Provided that the spot can be subdivided into intervals, again a time-related and sequence-related analysis is possible, which permits conclusions as concerns the contents of the spots and their structure. When, however, the spot analysis is subdivided into intervals, then it is possible to optimize the contents of the spots and the structure of the spots because of the effectiveness and attention, respectively, which the individual sequences of the advertising messages have achieved. Due to the high image analyzing frequency, an interior decomposition of the spots is possible. Since, for example, with a spot lasting for 15 second at a scanning frequency of 7.5 Hz, more than 100 images are available for the analysis, whereby said images can be decomposed in a plurality of spot intervals, for example, into five reasonable spot intervals, the advertising effectiveness of the individual scenes can be very well and exactly detected therefrom.

DETAILED DESCRIPTION OF THE INVENTION

Figure 2:
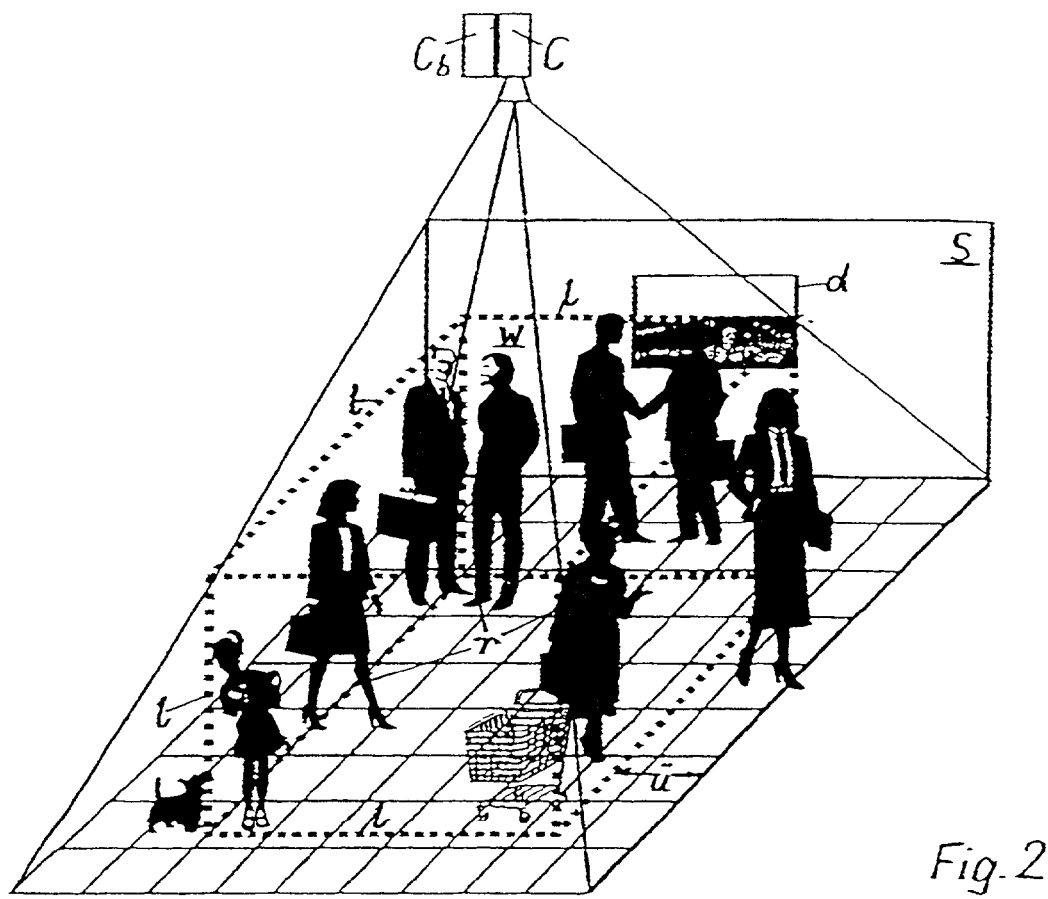
Figure 3:
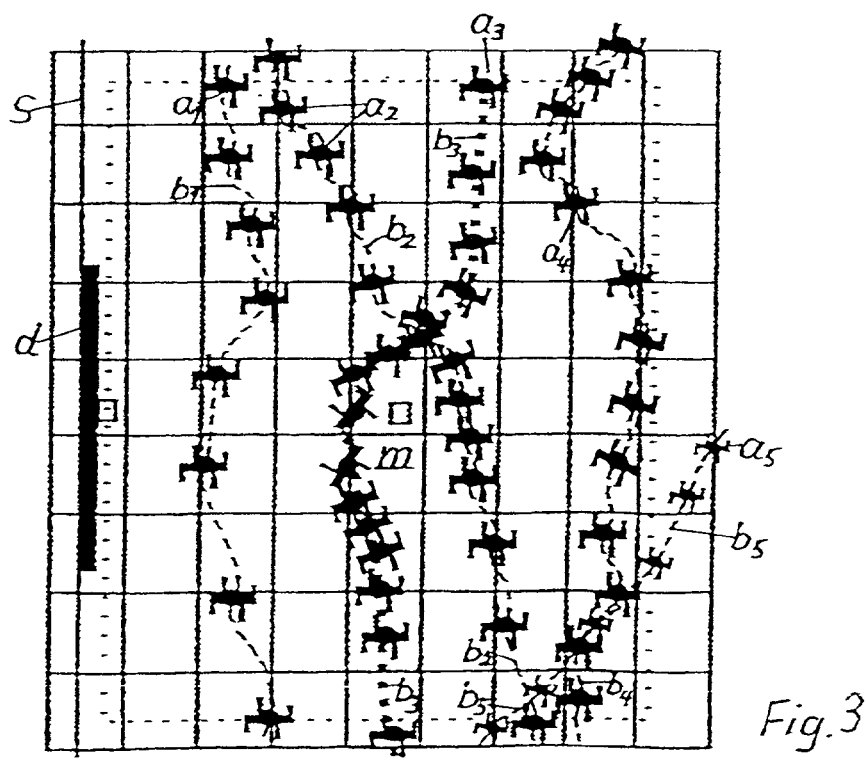
Figure 4:
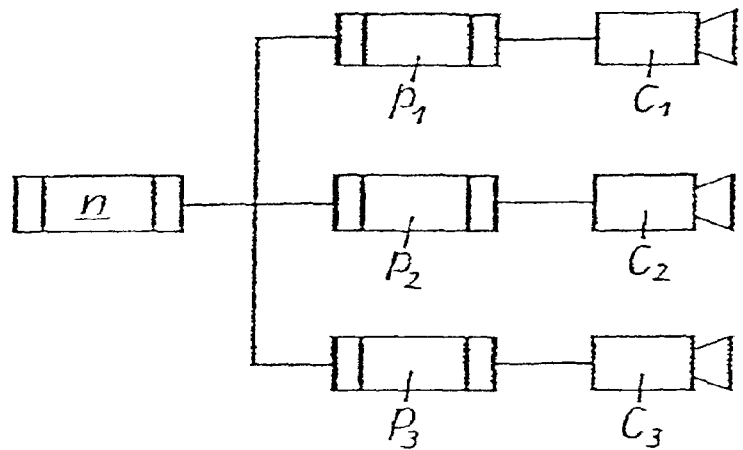
Figure 5:
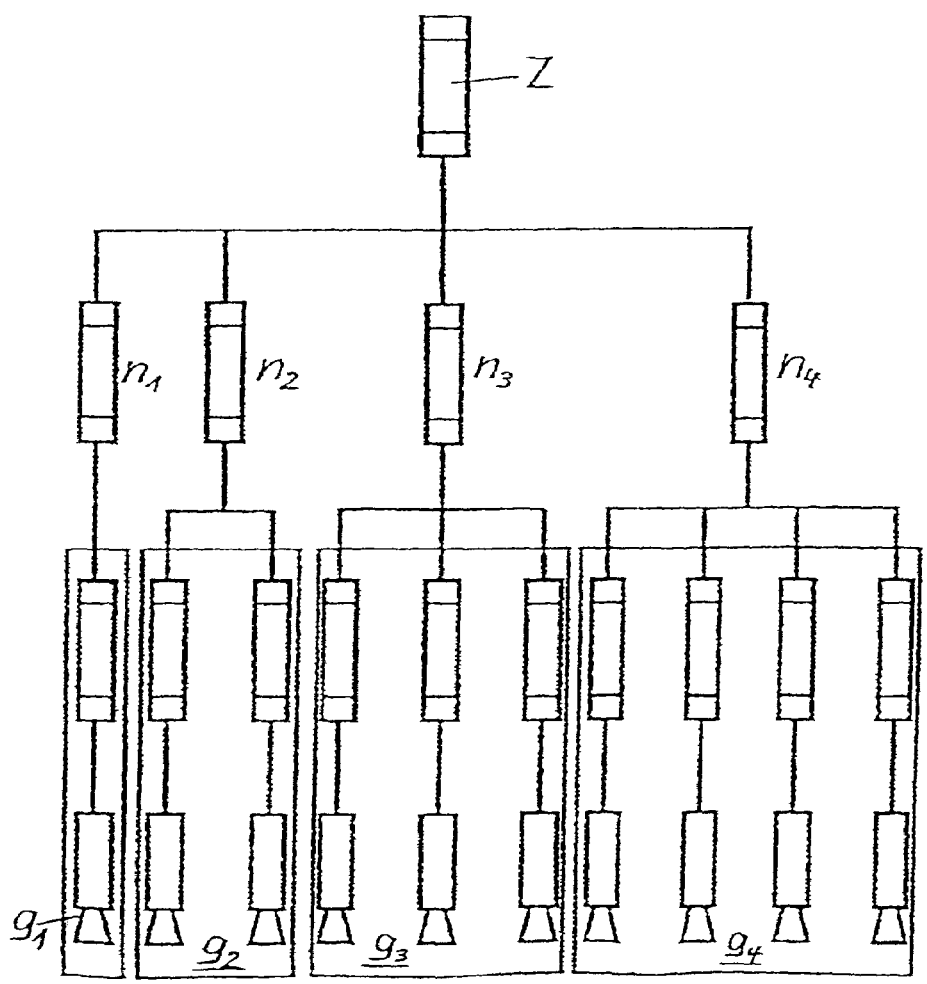

In the following, the invention will be explained in more detail by virtue of the schematical drawings. There is shown in:

FIG. 1 a passage with three defined rooms,

FIG. 2 the effect of the central perspective of the camera on the detected room, FIG. 3 the image of a reception room on a CCD-matrix of a camera, FIG. 4 the principle layout of the arrangement according to the invention, and FIG. 5 a combination of a plurality of inventional arrangements with a central unit for evaluation and providing commands.

In FIG. 1 different objects and subjects (recipients) r are represented executing different movements and directions of movements in defined reception rooms $w_1$ through $w_3$ of a passage P. The differences in the objects and subjects are exemplified by their differentiated reflection behavior which, in turn, is due to size, clothing, body form, age, gender, persons and matter taken along by them, etc. which are here summarized under the term of characteristic or specific features. A display d is arranged at a sidewall s of the reception room $w_2$. A camera module $c_1$ respectively $c_2$ respectively $c_3$ is associated to each reception room $w_1$ through $w_3$. In accordance with a preselected time schedule, said camera module detects the contents of its reception room and feeds it into a not shown evaluation unit. In this way it is possible to detect the persons as recipients r by number and differentiation, their movements, turns of the body, movements of head and arms, their stops, and to conclude therefrom the attention they pay to the advertising messages on the display. By the overlapping ranges $ü_i$, the passing over of the persons identified by coordinates and characteristic features to a following evaluation unit (not shown in FIG. 1), which is succeeding the camera module $c_i$, will be possible (range overlapping tracking), said evaluation unit will be described in the following.

FIG. 2 again shows a reception room w covered by a sensor module c, and a display d arranged at a sidewall s of said reception room w. The sensor c is coupled to a biosensor $c_b$ which also can be an integral component of the sensor c and which evaluates spectroscopically or radiologically the radiation features differentially reflected at the recipient r. In said reception room w there are several recipients r that move into different directions respectively, stop and stay at definite places. A space circumscribed by the dotted line l makes clear that only the recipients (objects and subjects, respectively) r in this space are completely captured. Hence, the ground plans of the mutually adjacent reception rooms $w_i$ have to overlap due to the central perspective of the optical imaging and to the end that the identified persons have to be taken over, so that all the recipients, with respect to their movements and specific features, can be completely detected up to a height of about 2 m.

In FIG. 3 there is shown a CCD-matrix m of a sensor module c with a sufficient resolution. On said sensor module c both, a non-displaceable sidewall s, provided with a display d, is represented and recipients r as pixel blots $a_i$. The pixel blots are provided as gray values conditioned by the respective persons, environment, and movement, whereby the recipients r move on track $b_i$. Thereby a plurality of exposures are superimposed, which are taken at a frequency of, for example, 25 Hz and from which, for example, every fourth and second, respectively, is to be used for evaluation. It can clearly be seen that the recipient r corresponding to the pixel blot $a_1$ has moved with a greater speed than the recipients $r_i$ represented by the pixel blots $a_2$, $a_3$, $a_4$, from these only the recipient represented by the pixel blot $a_3$ has turned to and faces the display. Furthermore, it can be seen that the recipients represented by the pixel blots $a_2$, $a_3$, $a_4$ have moved with very differing speeds at different times, whereby the recipient represented by the pixel blot $a_3$ indicates his/her being interested in the displayed message in that he/she remarkably reduces the speed down to a stop. The recipient represented by the pixel blot $a_5$ and moving on the track $b_5$, only tangiently passes the defined and imaged room.

In FIG. 4 similar to FIG. 1 three sensor modules $c_1$, $c_2$, $c_3$ are represented followed by three image processing modules $p_i$ and a common database module n. The image processing modules $p_i$ constantly generate a plurality of data, by the time dependent analyses of which in the database module n the number and behavior of the customers is achieved time-dependently. Instead of being arranged in spaced apart relation the sensor modules $c_i$ and the image processing modules $p_i$ can be combined into a unit.

Thus, the time-dependent analysis of the movements of persons and the specific features of persons will be combined with the messages or actions offered time-dependently visually, audiovisually and auditorily, respectively. In this way the spot-related behavior and the action related behavior, respectively, of individual recipient can be analyzed as well as the flow of customers. The images generated in the sensor modules $c_i$ will be processed in the image processing modules $p_i$. Thereby the specific optical features (gray values or color values etc.) are detected for each person just as the concentration point coordinates of the body or of parts of the body (extremities, head, nose) and the coordinates of circumscribing polygons. An identification number is associated to each person detected in such a way. Furthermore, the speeds and the vectors of direction of the movements of persons will be detected in the image processing modules $p_i$ just as their mutual distances and their distance to the site of presentation.

The data detected in this manner are fed into the database module n which therefrom computes the movement behavior of the individual persons up to the stay time, it also determines a mean velocity in defined action rooms or reception rooms, and the speed of the individual persons is related to the mean velocity. Thus, the database module n can detect direct and indirect criteria of attention, it further can evaluate them as to their importance and can form mean values. Direct criteria of attention are original ones, for example, coordinates, indirect criteria are deducted ones such as speed.

FIG. 5 shows four module units $g_1$, $g_2$, $g_3$, $g_4$, which are differently equipped with camera processing modules and image processing modules. A respective database module $n_1$, $n_2$, $n_3$, $n_4$ is associated to each module unit $g_1$, $g_2$, $g_3$, $g_4$, and all the database modules are connected to a central evaluation module and, if necessary, control module z, into which they feed their data and by which they are controlled, if required, spot-dependently. By virtue of the analyzing data, the control module z is capable of optimizing the projection mode of the spots as concerns their sequence, position and frequency.

All features disclosed in the specification, in the subsequent claims, and in the drawings are substantial for the invention both, individually and in any combination with one another.

LIST OF REFERENCE NUMERALS $a_i$ pixel blot/s
$b_i$ tracks
c, $c_i$ camera and sensor modules, respectively,
$c_b$ bio-sensor
d display
$g_i$ module units
l dotted line/line draw
m CCD matrix
n, $n_i$ database module/s
$p_i$ image processing modules
r recipient/s
s sidewall/s
ü/$ü_i$ overlapping ranges
w, $w_i$ reception rooms
z central evaluation module and control module
P passage

What is claimed is:

1. A method for detecting and analyzing behavior of at least one person in at least one room in dependence on at least one visual, audiovisual and/or auditory message intended to influence actions and/or path of movement of said at least one person, comprising:

detecting time-dependently by at least one predetermined frequency the position coordinates of said at least one person, the body coordinates of said at least one person, turns and rotations of said at least one person's body and/or parts thereof as well as said at least one person's posture and/or attitude of said at least one person's extremities from said at least one persons's entry into the room up to said at least one person's exit from the room; and analyzing one or more of said position coordinates body coordinates, turns and rotations of said at least one person's body and/or parts thereof and posture and/or attitude of said at least one person's extremities to determine the influence of said at least one visual, audiovisual and/or auditory message on said at least one person.

2. Method as claimed in claim 1, wherein the body coordinates comprise both concentration point coordinates of a projection of said at least one person and of single parts of the body of said at least one person as well as the outline coordinates of said at least one person.

3. Method as claimed in claim 1 for detecting and analyzing behavior of said at least one person in a plurality of adjacent rooms, wherein at least one identification value and respective coordinates are associated with said at least one person, said identification value and respective coordinates being used for continuing to monitor said at least one person when said at least one person moves from one room to a room adjacent thereto.

4. Apparatus for detecting and analyzing the behavior of at least one person in at least one room in dependence on at least one visual, audiovisual and/or auditory message intended to influence actions and/or path of movement of said at least one person in said at least one room, comprising means for detecting time-dependently by at least one predetermined frequency the position coordinates of said at least one person, the body coordinates of said at least one person, turns and rotations of said at least one person's body and/or parts thereof as well as said at least one person's posture and/or attitude of said at least one person's extremities from said at least one person's entry into up to the said at least one person's exit from the room, the detecting means comprising at least one sensor module in an upper position of each room, said sensor module being adapted for detecting the electromagnetic radiation from said at least one person present in said room, and at least one image processing module and at least one database module, said sensor, image processing and database modules being operatively connected together, wherein the apparatus is adapted for analyzing one or more of said position coordinates, body coordinates, turns and rotations of said at least one person's body and/or parts thereof and posture and/or attitude of said at least one person's extremities to determine the influence of said at least one visual, audiovisual and/or auditory message on said at least one person.

5. Apparatus as claimed in claim 4, comprising a plurality of said sensor modules and said image processing modules.

6. Apparatus as claimed in claim 5, further comprising a central evaluation and control module and wherein a plurality of said database modules are operatively connected to said central evaluation and control module.

7. Apparatus as claimed in claim 4, wherein said at least one sensor module comprises first and second sensor modules, said second sensor module being associated with said first sensor module and being adapted for transmitting electromagnetic or thermal radiation for spectroscopic or thermal evaluation thereof.

8. Apparatus as claimed in claim 7, wherein said first sensor module is a CCD-camera.

9. Apparatus as claimed in claim 4, wherein the upper portion of each room is a central area of a ceiling of the room.

10. Apparatus as claimed in claim 4, wherein said at least one room comprises a plurality of contiguous rooms including areas characterized as one of said contiguous rooms overlapping areas characterized as another of said contiguous rooms.

11. Method according to claim 1, wherein said at least on predetermined frequency is greater than 1 Hz.

12. Method according to claim 11, wherein said at least one predetermined frequency is in a range of 7 to 30 Hz.

13. Apparatus according to claim 4, wherein the frequency of the means for detecting is at least 1 Hz.

14. Apparatus according to claim 13, wherein the frequency of the means for detecting is a range of 7 to 30 Hz.

* * * * *